(12) United States Patent
Turski et al.

(10) Patent No.: US 9,380,015 B2
(45) Date of Patent: Jun. 28, 2016

(54) ELECTRONIC MESSAGE ORGANIZATION VIA SOCIAL GROUPS

(71) Applicant: Microsoft Corporation, Redmond, WA (US)

(72) Inventors: Andrzej Turski, Redmond, WA (US); Lili Cheng, Bellevue, WA (US); Michael Anthony Affronti, Seattle, WA (US); Shane Williams, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

(21) Appl. No.: 14/327,198

(22) Filed: Jul. 9, 2014

(65) Prior Publication Data

US 2014/0325005 A1 Oct. 30, 2014

Related U.S. Application Data

(63) Continuation of application No. 12/501,495, filed on Jul. 13, 2009, now Pat. No. 8,793,319.

(51) Int. Cl.
*G06F 15/16* (2006.01)
*H04L 12/58* (2006.01)
*G06Q 10/10* (2012.01)
*G06Q 50/00* (2012.01)

(52) U.S. Cl.
CPC .............. *H04L 51/24* (2013.01); *G06Q 10/107* (2013.01); *G06Q 50/01* (2013.01); *H04L 12/588* (2013.01); *H04L 51/32* (2013.01)

(58) Field of Classification Search
CPC ....... H04L 51/24; H04L 12/588; H04L 51/32; G06Q 10/107; G06Q 50/01

USPC .......................................................... 709/206
See application file for complete search history.

(56) References Cited

U.S. PATENT DOCUMENTS

| | | | |
|---|---|---|---|
| 7,366,759 B2 | 4/2008 | Trevithick et al. | |
| 7,454,470 B1 | 11/2008 | Isaacs et al. | |
| 7,487,213 B2 | 2/2009 | Zager et al. | |
| 7,606,865 B2 | 10/2009 | Kumar et al. | |
| 7,627,828 B1 | 12/2009 | Collison et al. | |
| 7,653,693 B2 | 1/2010 | Heikes et al. | |
| 7,657,597 B2 | 2/2010 | Arora et al. | |

(Continued)

OTHER PUBLICATIONS

Whittaker, et al., "ContactMap: Organizing Communication in a Social Desktop", Retrieved at <<http://modiin.njit.edu/docs/contactmapfinal.pdf>>, ACM Transactions on Computer-Human Interaction (TOCHI), vol. 11, Issue 4, Dec. 2004, pp. 1-19.

(Continued)

*Primary Examiner* — Melvin H Pollack
(74) *Attorney, Agent, or Firm* — Steve Wight; Sandy Swain; Micky Minhas

(57) ABSTRACT

A mechanism for automatically organizing electronic messages is described herein. Social groups of a particular user that may be representative of topics, people, projects, and the like can be automatically learned based at least in part upon historical correspondence of the user. Moreover, messages can be automatically prioritized based at least in part upon historical correspondence patterns. Electronic messages may be presented to the user in accordance with group information and how important the messages are to the user.

20 Claims, 11 Drawing Sheets

(56) References Cited

U.S. PATENT DOCUMENTS

| | | | |
|---|---|---|---|
| RE41,754 E | 9/2010 | Knight | |
| 7,870,205 B2 | 1/2011 | LeVasseur et al. | |
| 7,890,596 B2 | 2/2011 | Guy | |
| 7,899,871 B1 | 3/2011 | Kumar et al. | |
| 7,908,647 B1 * | 3/2011 | Polis | G06F 17/30997 713/151 |
| 7,979,411 B2 | 7/2011 | Mattox et al. | |
| 8,010,460 B2 | 8/2011 | Work et al. | |
| 8,010,508 B2 | 8/2011 | Audet | |
| 8,019,875 B1 | 9/2011 | Nielsen | |
| 8,032,409 B1 | 10/2011 | Mikurak | |
| 8,032,470 B1 | 10/2011 | Heidenreich et al. | |
| 8,032,622 B2 | 10/2011 | Caspi et al. | |
| 8,037,150 B2 | 10/2011 | Weaver et al. | |
| 8,069,166 B2 | 11/2011 | Alvarado et al. | |
| 8,144,007 B2 * | 3/2012 | Tuck | G01N 33/56977 340/539.1 |
| 8,161,419 B2 | 4/2012 | Palahnuk et al. | |
| 8,170,978 B1 * | 5/2012 | Newstadt | G06Q 10/10 706/45 |
| 8,180,852 B2 | 5/2012 | Lee et al. | |
| 8,190,724 B2 * | 5/2012 | Norton | G06Q 10/00 709/223 |
| 8,301,704 B2 * | 10/2012 | Gross | H04L 51/28 709/201 |
| 8,413,059 B2 * | 4/2013 | Lee | H04L 51/32 709/206 |
| 8,639,762 B2 * | 1/2014 | Rasmussen | G06Q 10/107 709/204 |
| 8,661,002 B2 * | 2/2014 | Smith | G06Q 10/107 707/614 |
| 8,667,069 B1 * | 3/2014 | Connelly | H04L 51/32 709/206 |
| 8,726,169 B2 * | 5/2014 | Payne | G06F 3/0481 715/705 |
| 8,751,440 B2 * | 6/2014 | Gorti | G06Q 30/02 705/319 |
| 8,762,285 B2 * | 6/2014 | Davis | G06Q 30/02 705/319 |
| 8,782,151 B2 * | 7/2014 | Wang | G06Q 10/10 709/206 |
| 8,798,321 B2 * | 8/2014 | Myers | G06K 9/00288 382/103 |
| 8,826,375 B2 * | 9/2014 | Smith | G06Q 10/10 709/201 |
| 8,874,572 B1 * | 10/2014 | Broyles | G06Q 10/10 705/319 |
| 8,892,630 B1 * | 11/2014 | Curtis | G06Q 50/01 709/203 |
| 9,003,315 B2 * | 4/2015 | Behar | G06F 1/162 715/744 |
| 9,021,386 B1 * | 4/2015 | Rasmussen | G06F 3/002 715/785 |
| 9,037,516 B2 * | 5/2015 | Abhyanker | G06Q 30/0261 705/319 |
| 9,043,418 B2 * | 5/2015 | Appelman | H04L 51/04 709/206 |
| 9,123,079 B2 * | 9/2015 | Zigoris | G06Q 50/01 |
| 2005/0063365 A1 | 3/2005 | Mathew et al. | |
| 2005/0198171 A1 | 9/2005 | Landsman et al. | |
| 2007/0203991 A1 | 8/2007 | Fisher et al. | |
| 2009/0049132 A1 | 2/2009 | Livne Gutovski | |
| 2009/0094048 A1 | 4/2009 | Wallace et al. | |
| 2009/0106676 A1 | 4/2009 | Brezina et al. | |
| 2009/0319629 A1 | 12/2009 | de Guerre et al. | |
| 2010/0179991 A1 | 7/2010 | Lorch et al. | |
| 2010/0205179 A1 | 8/2010 | Carson et al. | |
| 2010/0217641 A1 | 8/2010 | Siegel | |
| 2010/0251139 A1 | 9/2010 | Vance et al. | |
| 2010/0268655 A1 | 10/2010 | Cheuoua | |
| 2010/0325218 A1 | 12/2010 | Castro et al. | |
| 2011/0010182 A1 | 1/2011 | Turski et al. | |
| 2014/0304622 A1 * | 10/2014 | Jorasch | H04L 12/1813 715/753 |
| 2015/0120533 A1 * | 4/2015 | Jung | G06Q 20/24 705/39 |
| 2015/0236993 A1 * | 8/2015 | Notani | H04L 51/063 709/206 |
| 2015/0294377 A1 * | 10/2015 | Chow | G06Q 30/0263 705/347 |

OTHER PUBLICATIONS

Alstyne, Van, et al., "EmailNet: A System for Automatically Mining Social Networks from Organization Email Communication", Retrieved at <<http://ipresearch.net/emailnet/EmailNet-final.doc>>, In Proceedings of Annual Conference of the North American Association for Computational Social and Organizational Sciences (NAACSOS'03), Jun. 22-25, 2003, pp. 1-4.

Gloor, et al., "Temporal Visualization and Analysis of Social Networks", Retrieved at <<http://www.ickn.org/documents/CKN4NAACSOS.pdf>>, NAACSOS Conference, Pittsburgh, PA, North American Association for Computational Social and Organizational Science, Jun. 27-29, 2004, pp. 1-5.

"Yahoo! Unveils a Smarter Inbox for Yahoo! Mail", Retrieved at <<http://yhoo.client.shareholder.com/releasedetail.cfm?releaseid=354420>>, Dec. 15, 2008, pp. 1-3.

Karpinski, Rich, "(Social) Power to the Email Inbox!", Retrieved at <<http://smartbiz.com/article/view/2323/1/58>>, May 18, 2009, p. 1-2.

Perez Sarah, "Xobni: Social Network in Your Inbox", Retrieved at <<http://www.readwriteweb.com/archieves/xobni_social_network_in_your_inbox.php>>, Jan. 14, 2008, pp. 1-3.

Farnham, et al., "Personal Map: Automatically Modeling the User's Online Social Network", Retrieved at <<http://www.idemployee.id.tue.nl/g.w.m.rauterberg/conferences/INTERACT2003/INTERACT2003-p567>>, Proceedings of IFIP INTERACT103: Human-Computer Interaction, 2003, pp. 567-574.

Non-Final Office Action dated Dec. 2, 2011, U.S. Appl. No. 12/501,495, 16 pages.

Non-Final Office Action dated Jul. 23, 2012, U.S. Appl. No. 12/501,495, 15 pages.

Final Office Action dated Apr. 5, 2013, U.S. Appl. No. 12/501,495, 20 pages.

Reply to Office Action dated Dec. 2, 2011, Filed on Mar. 30, 2013, U.S. Appl. No. 12/401,495, 18 pages.

Reply to Office Action dated Jul. 23, 2012, Filed on Jan. 15, 2013, U.S. Appl. No. 12/401,495, 16 pages.

Reply to Final Office Action dated Apr. 5, 2013, Filed on Jun. 26, 2013, U.S. Appl. No. 12/401,495, 15 pages.

* cited by examiner

ELECTRONIC MESSAGE ORGANIZATION VIA SOCIAL GROUPS

RELATED APPLICATION

This application is a continuation of U.S. patent application Ser. No. 12/501,495, filed on Jul. 13, 2009, and entitled "ELECTRONIC MESSAGE ORGANIZATION VIA SOCIAL GROUPS", the entirety of which is incorporated herein by reference.

BACKGROUND

Individuals often use electronic communications to communicate with others, wherein electronic communications include email, instant messaging, posting comments with respect to a story or blog, writing a blog, text messaging through utilization of mobile phones, amongst others. For instance, individuals today can use an email application to communicate with other people, to transfer documents or other files to individuals in a professional setting, to share pictures/videos with family or friends, etc.

Typically, email applications are configured to display emails to users based upon time of transmittal or receipt of an email. Thus, an email received more recently is typically presented above an email received later in time. Many email applications additionally include a mechanism that allows emails to be displayed based upon sender of the email, subject of the email, or other suitable criteria. Because so many people use email to communicate with one another, organizing emails in an effective manner can be problematic.

One example manner for organizing emails is creation of folders in an email application, wherein an email can be manually or automatically (based upon rules defined by a user) placed in a particular folder. Thus, for instance, a user can create an email folder that corresponds to family members of the user. When an email is received from a family member of the user, the user can cause the email to be located in the created folder. Moving emails from an inbox of an email application to an appropriate folder can be done manually, such that the user first reads the email and determines which folder the email belongs to and thereafter manually transfers the email to the appropriate folder. In another example, the user can generate one or more customized rules that cause emails to be automatically transferred from an inbox to a folder at the time the email is received (such that the user never sees the email in the inbox).

While use of folders can be an effective manner for organizing a substantial number of emails, organizing emails in such a manner can be expensive in terms of time. Additionally, many users are apprehensive in connection with causing email to be automatically moved from an inbox to a certain folder, as the user may forget to review contents of the folder.

SUMMARY

The following is a brief summary of subject matter that is described in greater detail herein. This summary is not intended to be limiting as to the scope of the claims.

Described herein are various technologies pertaining to organization of electronic messages. As used herein, an electronic message may be an email, an instant message, a notification about a new or changed web page content (often delivered as an RSS feed), or other suitable message. As will be described in greater detail herein, historic interactions of a user (and possibly other related information) can be analyzed, and social groups of the user can be generated based at least in part upon the analysis. Further, importance of an electronic message to an individual can be inferred based upon historic interaction of the user with the sender of the electronic message and/or other intended recipients of the electronic message. Accordingly, the electronic message can be selectively displayed in a graphical user interface in accordance with the inferred importance such that messages deemed to be of greater importance are displayed more prominently to the individual. The importance of the electronic message can be inferred based upon one or more of a variety of parameters pertaining to the historic interactions of the individual, including topic or topics of the electronic message, frequency of interaction with individuals that are intended recipients of the electronic message, current events, etc.

The deemed importance of an electronic message can additionally be utilized to display the electronic message in a particular place (or not at all) in a graphical user interface. For instance, if the electronic message corresponds to a feed that is rarely read by the individual, such message can be placed at the periphery of a graphical user interface. Periodically or from time-to-time, messages found to be of little importance can be summarized and presented to the individual (e.g., included in an email that is automatically transmitted to the individual, wherein the email comprises a summary of multiple messages deemed to be of relatively little importance to the individual). Thus, the individual can quickly peruse the summary to ascertain if anything in any of the messages is interesting to the individual, and if so, may review individual messages. Thus, electronic messages that are aged, electronic messages pertaining to folders that are rarely read, electronic messages that are manually moved out of the inbox, etc. can be placed in the periphery of the graphical user interface and summarized in an automated fashion according to a schedule, for instance.

Moreover, electronic messages can be assigned/clustered into one or more groups, wherein a group can be representative of a group of people, a project, events, topics, long-running conversations, etc. The utilization of groups and inferred priority can be utilized to provide an uncluttered view of an email inbox, for instance, such that the user can quickly ascertain what topics are deemed to be important to the user, what items/messages, conversations are deemed to be important to the user, which individuals are deemed to be important to the user, etc. Again, this uncluttered view can be provided to the individual as a function of historical interactions of the individual, which can be analyzed to learn what/who is and is not important to the user. Additionally, the individual can manually override membership of a group and/or inferred importance of a message.

As indicated above, a group can include a plurality of individuals, and the collection of such individuals can be representative of a topic, a conversation thread, a certain collection of people (e.g., family members), etc. A group can be selected, which can cause additional information pertaining to the group to be presented to the user. This information may include updates to social networking sites pertaining to one or more members of the group, information pulled from other sources that may be relevant to the group or topics discussed in the group, such as news stories or other information that may be pertinent to the group. Moreover, attachments and/or links transmitted amongst members of the group can be collected and displayed to the individual when the group is selected by the individual. In addition, data objects (including files, web pages, links, etc.) shared among the members of the group and stored in some persistent locations known to the individual can also be presented to the user.

DETAILED DESCRIPTION

Figure 1:
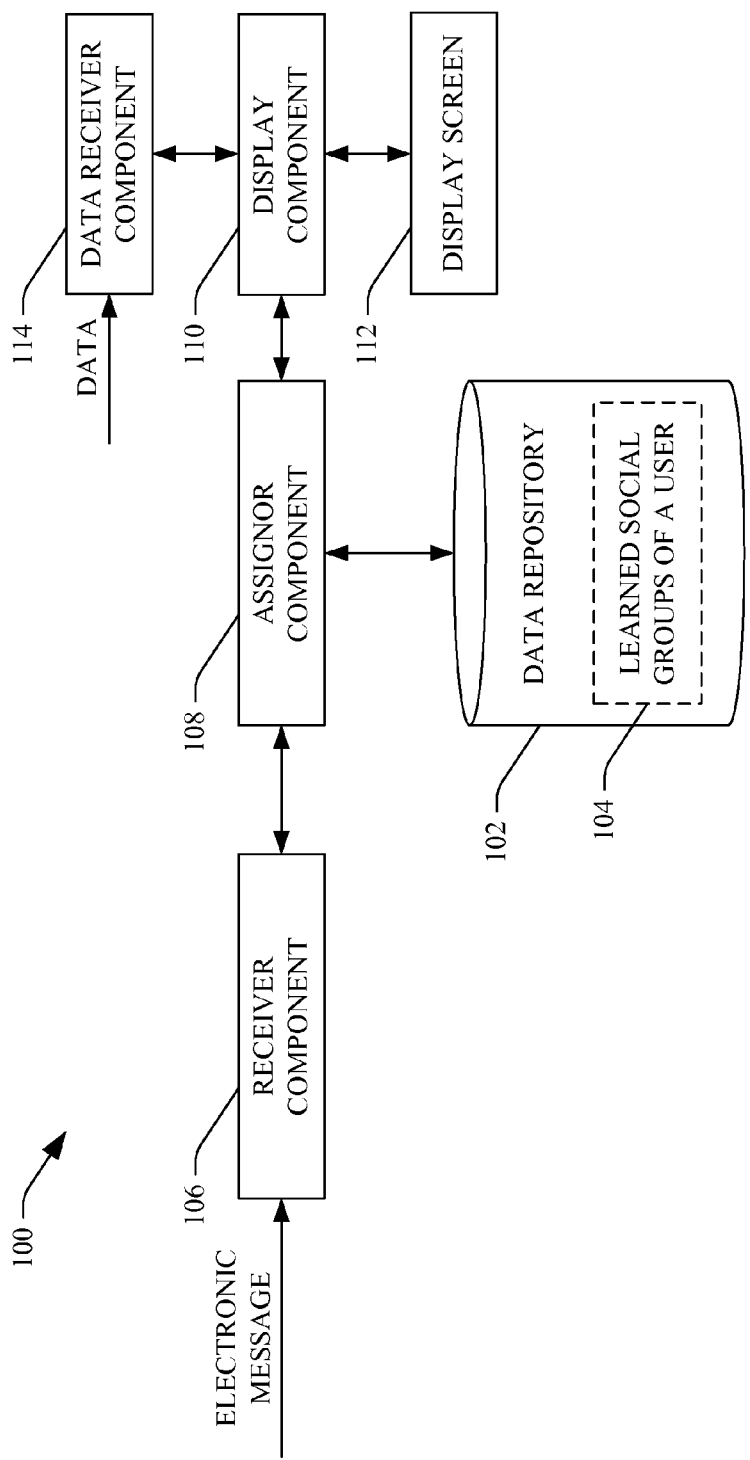
FIG. 1 is a functional block diagram of an example system that facilitates assigning an electronic communication to a learned social group of a user.

Various technologies pertaining to organization of electronic messages in general and assigning electronic messages to learned social groups in particular will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

Described herein are various systems, methodologies, and graphical user interfaces that pertain to organization of electronic messages of an individual in an intuitive manner. Such organization is accomplished via organizing messages around people (e.g., groups) that can be representative of a collection of people, one or more topics, a long conversation, etc. Furthermore, priority of electronic messages can be inferred and can be displayed (or not displayed) in a manner that corresponds to the priority. Priority of a message can be inferred based at least in part upon historical correspondence, which can be indicative of which people are important to the individual, which topics are important to the individual, etc. Moreover, active learning can occur, as the individual can manually provide input as to what is and is not important (e.g., change priority of a received electronic message). These and other features will be described in greater detail herein.

With reference to FIG. 1, an example system 100 that facilitates automatic assignment of an electronic message to a learned social group of a user is illustrated. Pursuant to an example, at least a portion of the system 100 may be included in an email application (e.g., a web-based email application or a client email application executing on a computing device). In another example, at least a portion of the system 100 may be included in an instant messaging application, RSS feed aggregator, a social networking web site or other suitable system that receives electronic messages for display to an intended recipient of the electronic messages.

The system 100 includes a data repository 102 that comprises learned social groups of a user 104. A social group of the user is an individual or group of individuals that are in some manner associated with one another with respect to electronic messages received by the user. Accordingly, a learned social group can be representative of a topic, a long conversation, a particular collection of people (e.g., family), a project, etc. Thus, for instance a social group of the user may include a plurality of people that are in a particular portion of a company or who are assigned to work on a common task at a place of employment. Thus, a single individual can be included in multiple learned social groups, and a learned social group may include one or more individuals. Automated learning of the learned social groups (which is based upon historical communications and communication patters) of the user 104 will be described in greater detail below.

The system 100 further includes a receiver component 106 that receives an electronic message that is intended for the user. The electronic message received by the receiver component 106 may be an email message, an instant message, a comment to a social networking site of the user, an RSS notification about new or changed content, a text message or other suitable form of electronic communication. An assignor component 108 is in communication with the receiver component 106 and can assign the electronic message received by the receiver component 106 to one or more learned social groups of the user in the plurality of learned social groups of the user 104. For instance, the assignor component 108 can receive the electronic message and ascertain an identity of the sender of the electronic message and/or identities of other intended recipients of the electronic message. The assignor component 108 may then access the data repository 102 and locate one or more of the learned social groups of the user 104 that correspond to the received electronic message (e.g., locate one or more learned social groups that include the sender of the electronic message, locate one or more learned social groups that include other intended recipients of the electronic message, locate one or more learned social groups that are germane to a topic of the electronic message, . . . ). The assignor component 108 may then assign the electronic message to at least one learned social group of the user, wherein the assignment may be based at least in part upon the sender of the electronic message, upon a topic of the electronic message, upon other intended recipients of the electronic message, time that the electronic message was transmitted, subject of the electronic message, and/or the like. It is also possible that no relevant learned group is found, in which case the message may be left unassigned. Many unsolicited or unexpected messages may fall into this category. Messages not assigned to any learned group effectively form their own group and may also be presented to the user, as it will be discussed later.

The system 100 further includes a display component 110 that receives an indication that the assignor component 108 has assigned the electronic message to at least one particular learned social group of the user (it is to be understood that the electronic message can be assigned to multiple learned social groups). The display component 110 can cause the electronic message to be displayed on a display screen 112 of a computing device in a manner that indicates to the user that the electronic message is assigned to the at least one learned social group of the user. For instance, a particular graphical item can identify the learned social group. The display component 110 can cause at least a portion of the email to be displayed in a graphical user interface in conjunction with the graphical item that identifies the learned social group. Such graphical item may be a graphical item of a particular color or shape that identifies the learned social group of the user. In another example, the graphical item may be or include text that displays a name of the learned social group to the user. In still another example, the graphical item may be an image that identifies the learned social group of the user or visually connects the item with the group. Alternatively, the item may be placed in a part of the display screen 112 pertaining to the learned social group. Still further, the display component 110 can cause an audible sound to be output that indicates to the user of the system 100 that an electronic message has been received that has been assigned to the learned social group of the user. Additional detail pertaining to displaying messages in a graphical user interface is provided in greater detail below.

The system 100 may also optionally include a data receiver component 114 that can receive data from other sources such as social networking sites, blogs, news sites, file shares, etc. For example, the data receiver component 114 can be configured to actively search for content pertaining to a learned social group, such as items published or shared by the group members, news items pertaining to a topic germane to the learned social group, as well as updates to social networking sites made by members of the learned social group.

Additionally, the data receiver component 114 can be in communication with the display component 110, and the display component 110 can display data pertaining to data received by the data receiver component 114 from one or more sources. For instance, the system 100 may be or be included in an email application that is configured to receive, display and transmit emails. As described above, emails may be organized with respect to social groups of the user rather than organized with respect to manually created folders. The data receiver component 114 can be configured to receive data pertaining to individuals in learned social groups of the user from other sources. Thus, if an individual in a learned social group of the user updated a social networking site (e.g., with information pertaining to current status of the individual, posting of new photos or videos on a social networking site, etc.), the data receiver component 114 can receive such update(s) and the display component 110 can display data pertaining to the received data on the display screen 112. Additionally, information pertaining to data received by the data receiver component 114 can be assigned a graphical item that indicates to the user of the email application that the data pertains to a certain individual in a particular learned social group of the user. Thus, the email application may be configured to display updates pertaining to individuals in learned social groups of the user together with receiving, displaying and transmitting emails.

In yet another example, the data receiver component 114 can be configured to receive data pertaining to a topic that is relevant to a learned social group. For instance, the learned social group may pertain to one or more topics, and the data receiver component 114 can be configured to receive news stories or other information germane to the topic or topics. The data receiver component 114 can be configured to search the Internet, for instance, to acquire data pertaining to the topic or topics. The data receive component 114 can also be configured to search the Intranet or other locations that may not be publicly accessible, but are accessible to the current user.

Additional information pertaining to the learned social groups of the user 104 will now be provided. As indicated above, and as will be described in greater detail below, the learned social groups of the user 104 can be automatically learned based upon analyzing historical electronic message (e.g., email) correspondence of the user including identities of individuals who send electronic messages to the user, identities of other recipients of electronic messages received by the user, groupings of certain individuals on messages received by the user, etc. It is to be understood, however, that social groups are rarely static and typically alter over time. For instance, a learned social group of the user may include numerous individuals assigned to a project at a place of employment. Over time other individuals may be added to the project or certain individuals may be removed from the project. Electronic messages can be analyzed over time to update the learned social groups of the user 104. For example, if a certain individual in a first social group is typically included as a recipient in emails that include several other particular individuals, and over time is not included on such emails, it can be inferred that the particular individual is no longer a part of the first social group. Thus, learned social groups can be updated to represent changes in communication patterns of the user.

These updates can occur periodically (e.g., weekly, biweekly, monthly), upon receipt of a request to update the learned social groups from a user, upon detection of an anomaly in an electronic message received by the receiver component 106 (e.g., a new recipient or a new individual that is also an intended recipient of an electronic message), etc. Therefore, the assignor component 108 can have access to most recent social groups of the user when assigning an electronic message to a particular learned social group of the user.

In addition to assigning electronic messages to one or more learned social groups of the user, the assignor component 108 can automatically infer a level of importance of the electronic message based at least in part upon identities of intended recipients of the electronic message, sender of the electronic message, topic of the electronic message (e.g., content of the electronic message, subject of the electronic message), etc. Moreover, the assignor component 108 can infer the level of importance based at least in part upon frequency of correspondence between the sender and recipient of the electronic message, frequency of correspondence amongst recipients of the electronic message, how quickly the recipient tends to access messages from the sender, an inferred level of importance of a social group that corresponds to the electronic message, or other user behaviour with respect to electronic messages. For instance, if the electronic message is sent by an individual that frequently exchanges electronic messages with the user, the assignor component 108 can indicate that the electronic message is at least somewhat important to the user. Furthermore, the assignor component 108 can determine the level of importance of the electronic message based at least in part upon time that the electronic message was transmitted or received, information pertaining to how often the user sends electronic messages to the sender of the electronic message received by the receiver component 106, whether the sender of the electronic message is a first-time sender, a domain name pertaining to the email address of the electronic message sender, amongst other data.

The assignor component 108 may then assign the inferred level of importance to the received electronic message, and the display component 110 can display the electronic message in a manner that indicates a level of importance to the user. For instance, if the electronic message is deemed to be relatively unimportant, the display component 110 can cause the message to be placed in the periphery of a graphical user interface (and displayed to the user in a summary message transmitted at a later time). If the electronic message is deemed to be relatively important, the display component 110 can cause the electronic message to be displayed prominently in the graphical user interface. Thus, electronic messages can be automatically organized/prioritized based at least in part upon social groups of a user and inferred importance of messages.

With additional detail pertaining to low priority messages, the system 100 can be configured to generate summaries of messages that the user may otherwise have overlooked, such as messages moved to a folder outside of a general inbox of the user (per a user-generated rule), a weekly newsletter that the user often chooses not to read, messages automatically removed from the general inbox based upon the assignor component 108 inferring that the messages are low priority messages, etc. The assignor component 108 or other suitable component can cause an email to be generated and transmitted to the user, wherein the email includes a summary of the aforementioned low priority messages. The email can be transmitted on a schedule, when a threshold number of low priority messages are received, from time to time, periodically, from time to time, etc. In another example, rather than including a summary of low priority messages in an email, the system 100 can be configured to summarize low priority electronic messages in an instant message, in a web page post, in a text message, etc.

Moreover, a user can manually override a level of importance assigned to an electronic message by the assignor component 108. For instance, if the assignor component 108 assigns a level of importance to an electronic message that indicates to a user that the electronic message is relatively unimportant, the user can manually change the level of importance. The assignor component 108 can utilize such manual feedback in the future when assigning levels of importance to electronic messages.

Additionally, the sender of the electronic message can indicate manually that the electronic message is important (e.g., send the electronic message with high importance). In such a case, the assignor component 108 can be configured to refrain from altering the level of importance assigned to the electronic message by the sender. In another example, the assignor component 108 may assign a secondary level of importance to such an electronic message (e.g., the user flagged the electronic message as being important, and the assignor component 108 additionally flagged the message as being especially important).

The display component 110 may be configured to display at least a portion of the electronic message or data corresponding thereto in a manner that is based at least in part upon the level of importance assigned to the electronic message by the assignor component 108. For instance, the display component 110 can assign graphical indicia to at least a portion of the electronic message to convey an estimated importance of the electronic message to the user. In an example, the display component 110 can display an image corresponding to the sender of the electronic message together with the electronic message if the electronic message has an estimated importance above a threshold. The electronic message may be assigned a value of zero if deemed unimportant by the assignor component 108 or one if deemed important by the assignor component 108. If the value is above zero, the display component 110 can cause an image or other graphical item corresponding to the sender of the electronic message to be displayed in conjunction with at least a portion of the electronic message on the display screen 112 of the computing device. In another example, the display component 110 can cause at least a portion of a body of the electronic message to be displayed on the display screen 112 of the computing device if the electronic message is deemed to have an importance above a threshold. In yet another example, the display component 110 can be configured to display a summary of the electronic message if the assignor component 108 has assigned an importance level of the electronic message above a threshold. As will be shown and described in greater detail below, the display component 110 can be configured to display various information pertaining to electronic messages and/or learned social groups of the user.

Figure 2:
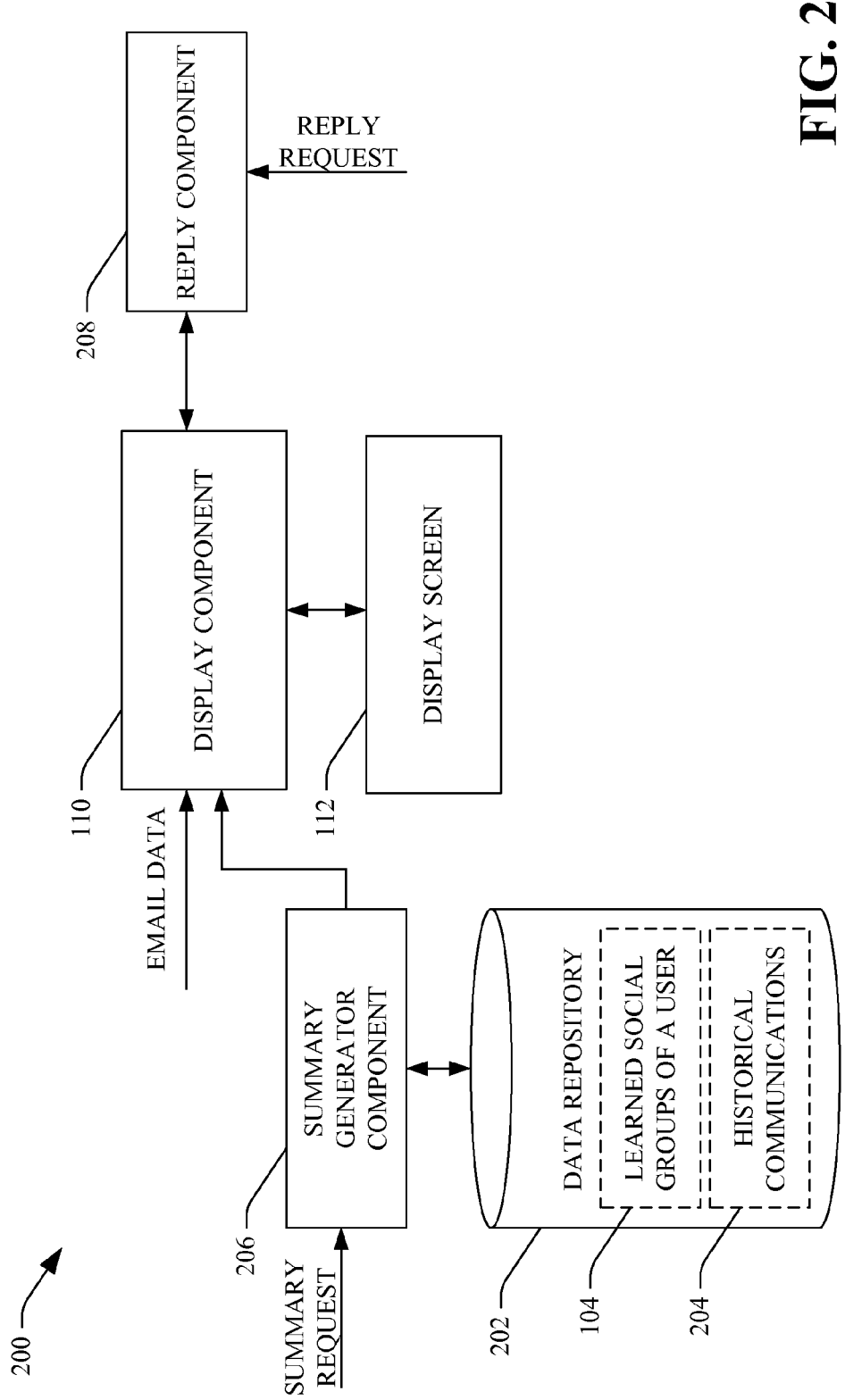
FIG. 2 is a functional block diagram of an example system that facilitates generating a summary pertaining to a learned social group of a user.

Referring now to FIG. 2, an example system 200 that facilitates displaying emails with respect to social groups of a user is illustrated. The system 200 comprises a data repository 202 that includes historical communications 204 pertaining to a user. For instance, the historical communications 204 can include emails sent by the user and received by the user, wherein each of the emails includes data that identifies the sender of the email and data that identifies one or more intended recipients of the email. Furthermore, the historical communications 204 may include instant messages, comments provided to a web site, log of phone and video calls, amongst other historical communications. The data repository 202 may additionally include the learned social groups of the user 104.

A summary generator component 206 may have access to contents of the data repository 202. For example, the summary generator component 206 can receive a request from the user to generate a summary pertaining to email usage of the user with respect to a particular learned social group or combination of learned social groups. The summary generator component 206 can access the learned social group or groups indicated in the summary request provided by the user and can analyze historical communications 204 with respect to the summary request. For instance, the summary request can identify a learned social group of the user and the summary generator component 206 can access historical communications pertaining to the learned social group. The summary generator component 206 may output data representative of a summary of activities of the user with respect to the identified learned social group. The summary can include information such as an amount of time spent by the user composing emails to certain members in the learned social group of the user, an amount of time spent by the user reading emails from certain members of the learned social group of the user, a number of emails transmitted or received from certain members of the learned social group, amongst other data. In addition, the summary generator component 206 may identify and display individual messages that may be of particular interest to the user based on known or inferred interests of the user, endorsements of content of the individual messages by other recipients, length of discussion pertaining to the messages, and other criteria. It may also summarize the whole set of messages by displaying their number, list of most frequently discussed topics, mostly repeated links, and other statistical or outstanding information.

The display component 110 can be in communication with the summary generator component 206 and can cause a summary with respect to at least one learned social group to be displayed to the user on the display screen 112 of the computing device. For example, the display component 110 can cause one or more graphs to be presented to the user to convey to the user summary data pertaining to communications between the user and members of the learned social group. The summary generator component 206 can also output attachments transmitted by individuals in the learned social group, links transmitted by individuals in the learned social group, attachments read by the user, links selected by the user, news information germane to the learned social group, amongst other data. The display component 110 can be configured to display such attachments/link/information data on the display screen 112 of the computing device.

Additionally, the display component 110 can receive email data that is to be displayed to the user on the display screen 112. Pursuant to an example, the display component 110 can format the email such that content of the email is displayed in a plurality of columns (e.g., similar to a magazine layout). A reply component 208 may also be in communication with the display component 110. The reply component 208 can receive a request from the user to reply to an email displayed on the display screen 112 by the display component 110. For instance, the user can be reading an email displayed on the display screen 112 of the computing device and may wish to transmit a reply to such email. The reply component 208 can receive the reply request from the user and the display component 110 can provide a field in the graphical user interface where the user can enter text to reply to the email message. Pursuant to an example, the display component 110 can display such field in-line with text of the email displayed on the display screen 112 of the computing device. That is, at least some text/content of the email displayed on the display screen 112 can be positioned above the field where the user can enter text to reply to such email.

Figure 3:
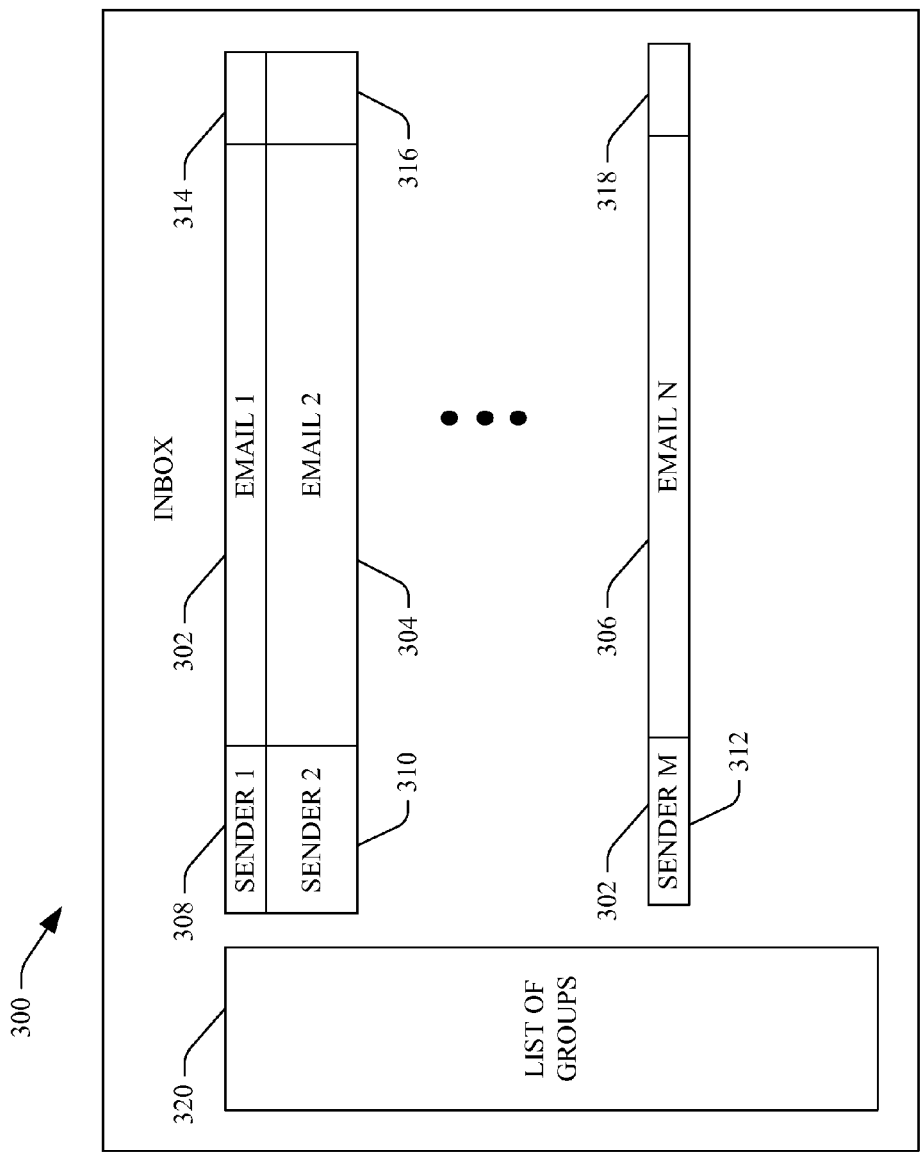
FIG. 3 illustrates an example graphical user interface that displays emails in connection with learned social groups.

With reference to FIG. 3, an example graphical user interface 300 of an email application is illustrated. For instance, the display component 110 can cause the graphical user interface 300 to be displayed on the display screen 112 of the computing device. Pursuant to an example, the graphical user interface 300 can correspond to an email inbox of a user. The graphical user interface 300 can display a plurality of email messages 302-306 received by various individuals in different learned social groups, wherein such messages 302-306 can be organized in accordance with time, subject, sender, group, etc. Each of the email messages 302-306 can have graphical items 308-312, respectively, that correspond thereto that are configured to identify the senders of the email messages 302-306. For instance, the graphical items 308-312 may be images of senders, may be text that identifies the senders, etc. In an example, the email 304 may be an email inferred to be important by the assignor component 108 (not shown), and accordingly such email 304 may be displayed more prominently in the graphical user interface 300 when compared to emails that are not found to be as important. In such a case, the graphical item 310 may be an image that is representative of the sender, while the graphical items 308 and 312 (that correspond to emails found to be of lower priority) may be text.

Each of the email messages 302-306 may also have graphical items 314-318, respectively, that correspond thereto that can identify a learned social group or groups to which the email messages 302-308 belong. For instance, the graphical items 314-318 may be of a particular color or colors that identify a certain learned social group or groups. Additionally, as an email message may be assigned to multiple learned social groups, the graphical items 314-318 may include multiple indicators that can identify learned social groups to which the electronic messages 302-306 have been assigned.

The graphical user interface 300 may further include a list of learned social groups 320, wherein the user can select a learned social group from amongst a plurality of learned social groups. Selection of a learned social group from the list of learned social groups 320 can cause a graphical user interface to be displayed that provides additional information pertaining to the selected learned social group, including but not limited to emails assigned to the learned social group, attachments included in emails assigned to the learned social group, etc. A special case includes selection of items that do not belong to any learned social group. This option may exist in the list 320 in addition to all learned groups. Selecting the option may display messages that are not assigned to any learned social group, attachments included in such messages, and information pertaining to individuals that are senders and/or recipients of these messages.

Figure 4:
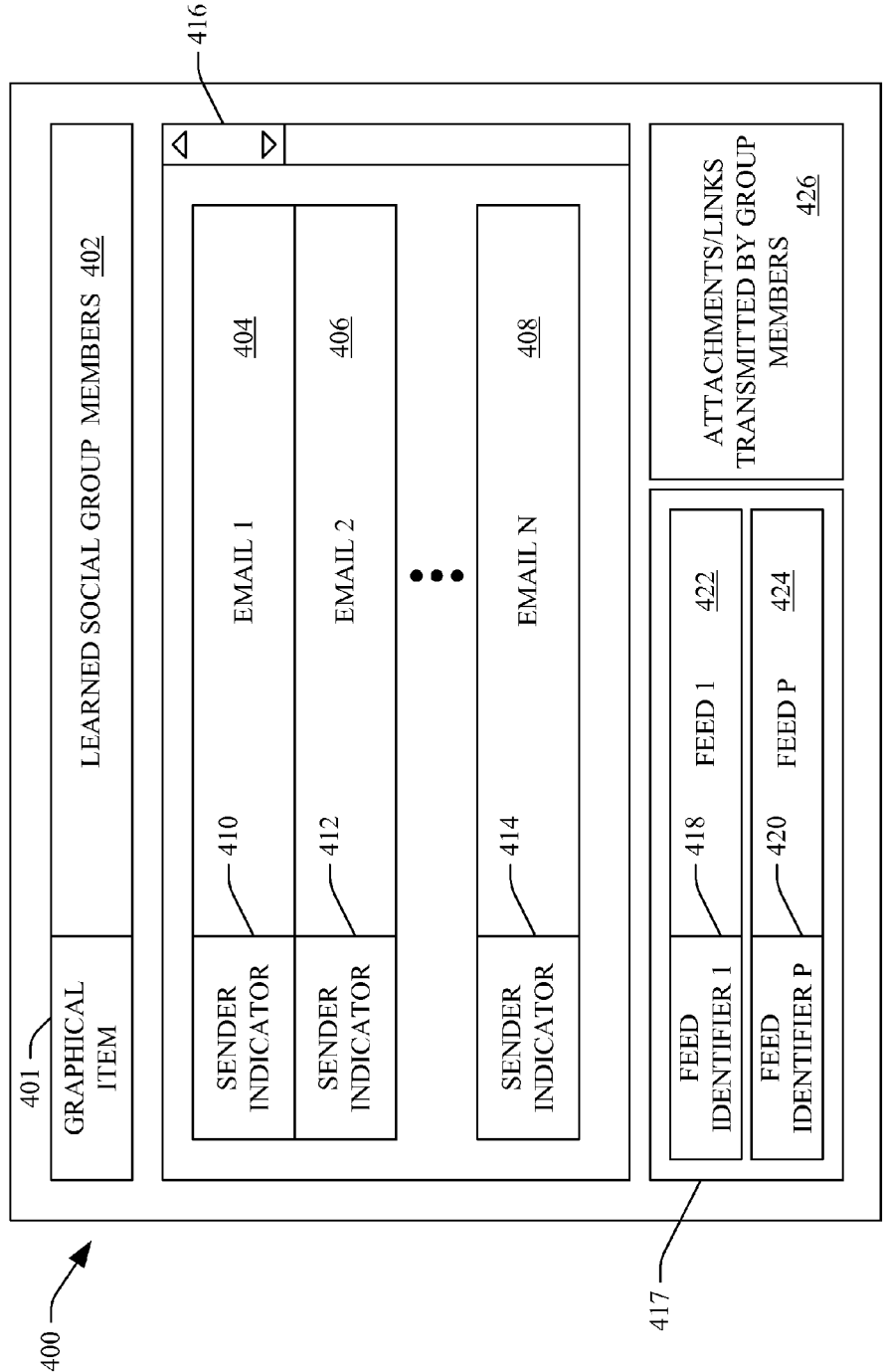
FIG. 4 illustrates an example graphical user interface that presents emails pertaining to a learned social group to a user.

Referring now to FIG. 4, another example graphical user interface 400 is illustrated. The graphical user interface 400 can be displayed to the user upon the user selecting a learned social group from the list of learned social groups 320 in the graphical user interface 300. The graphical user interface 400 can include a graphical item 401 that is representative of a learned social group selected by the user. Additionally, the graphical user interface 400 can include one or more graphical items 402 that are representative of individuals that are members of the learned social group. For example, the graphical items 402 may include images corresponding to individuals in the learned social group, text that depicts names of individuals in the learned social group, or other suitable graphical items. Therefore, the user can ascertain which individuals are members of the learned social group by reviewing the graphical items 402 that represent the group members.

The graphical user interface 400 may further include at least a portion of a plurality of emails 404-408 and sender indicators 410-414 that correspond to the emails 404-408 respectively. For example, the sender indicators 410-414 may be graphical items that are representative of senders of emails. Thus, the sender indicators 410-414 may be or include images or other suitable data, text and/or the like. A scroll bar 416 can be employed by the user to scroll through emails that have been assigned to the learned social group. As indicated above, the emails can be arranged based upon time, sender, determined level of importance or other suitable factor. Furthermore, the emails 404-408 can be presented differently depending upon an estimated importance thereof. For example, if the email 404 is marked as being important, the sender indicator 410 can be displayed, enlarged, and/or the email 404 can be expanded in comparison to the other emails shown in the graphical user interface 400.

The graphical user interface 400 may additionally include a field 417 that displays data pertaining to members of the learned social group of the user received from other sources. The data may include updates to a social networking web site of a member of the learned social group of the user, an update on a blog of an individual in the learned social group of the user, information relevant to a topic of the learned social group of the user (e.g., news stories), or other suitable data. The field 417 can include a plurality of data identifiers 418-420. The data identifiers 418-420 can be graphical items that represent individuals in the learned social group of the user. The data identifiers 418-420 can have data 422-424 that correspond thereto, respectively. For instance, the data 422 may be an update on a blog of an individual represented by the data identifier 418 while the data 424 may include data pertaining to a social networking web site of a member of the learned social group of the user represented by the data identifier 420. Therefore, the graphical user interface 400 can present additional information pertaining to individuals and/or topics in the learned social group of the user together with emails assigned to the learned social group of the user.

The graphical user interface 400 may also include a field 426 that displays attachments, links, shared data objects (which can include files, web pages, or other suitable data objects), or other suitable data to the user, where the attachments and/or links are included in emails assigned to the learned social group of the user and shared data was published by the members of the learned social group to shared places known to the user. Accordingly, the user need not sift through numerous emails or file shares to locate a particular attachment or file. Rather, the attachments and data objects can be displayed in the field 426 and the user can quickly cause the item to open by selecting such item from the field 426. The field 426 may also include data that indicates which attachments and/or links have been selected by the user or have not been selected by the user. For instance, the field 426 can indicate that each member of the learned social group of the user has opened and read a particular attachment while the user has yet to open and read the particular attachment. Furthermore, the field 426 can include data that indicates precisely which individuals in the learned social group of the user have read certain attachments presented in the field 426. Additionally, data that indicates which links have been read by the user and/or certain individuals in the learned social group of the user can be included in the field 426.

Figure 5:
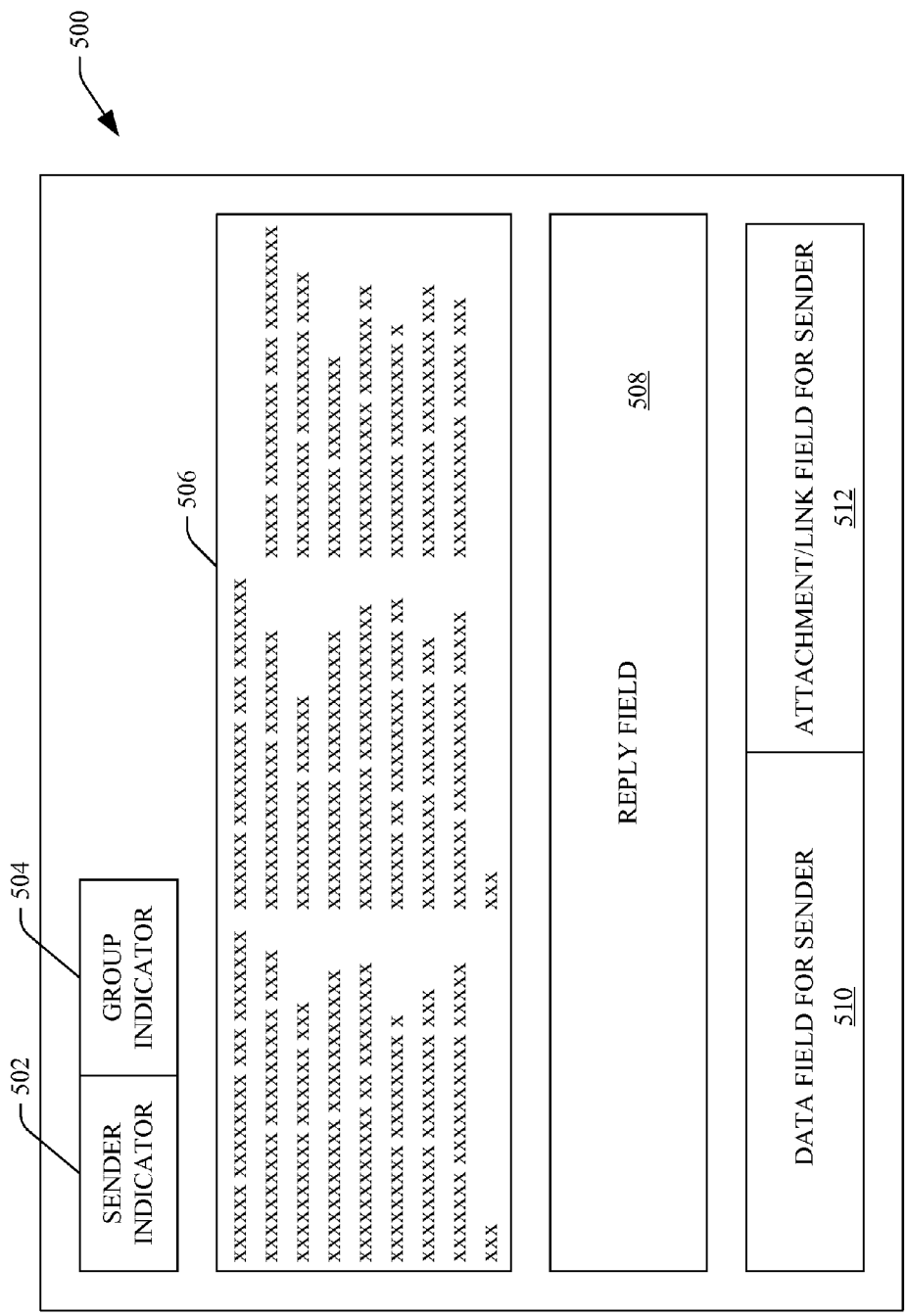
FIG. 5 is an example graphical user interface that depicts presentation of an email to an individual.

Now referring to FIG. 5, an example graphical user interface 500 is illustrated. The graphical user interface 500 can correspond to an email transmitted by an individual in a learned social group of the user, wherein the email is displayed upon the user selecting such email from the inbox or from a graphical user interface that corresponds to the learned social group. The graphical user interface 500 includes a sender indicator 502 that indicates to the user who is the sender of the email. A group indicator 504 indicates to which group the email has been assigned (e.g., by the assignor component 108). For instance, the sender indicator 502 may be or include an image (such as an image of the sender), text or other data that can identify the sender of the email. The group indicator 504 may be a color that can identify the group to which the email has been assigned. The graphical user interface 500 further includes a field 506 that includes the body of the email message. As shown, the display component 110 (FIG. 1) can format the body of the message such that the body of the message is shown in a plurality of columns (similar to a magazine layout). While not shown, the field 506 may also include a subject line of the email, time the email is transmitted, information pertaining to the sender of the email amongst other data.

The graphical user interface 500 may further include a reply field 508. For example, the user may wish to reply to the email and may depress a graphical button to indicate the desire to reply to such email. Upon depressing such button the field 508 can be presented to the user in line with at least some of the body of the email message. Thus, the reply field 508 can be displayed below at least some text in the body of the email message.

The graphical user interface 500 may also include a field 510 that displays data pertaining to the sender of the email, wherein such data is received from one or more sources. For example, the field 510 can display to the user most recent blog updates, comments added to other web sites by the sender of the email or other data from a source other than an email source that pertains to the sender of the email.

The graphical user interface 500 may also include a field 512 that displays attachments and/or links corresponding to the sender of the email. For example, the field 512 can display attachments and/or links transmitted to the user in email from the sender. In another example, the field 512 may present to the user attachments recently read by the sender of the email and/or links recently selected by the sender of the email. The attachments and/or links displayed in the field 512 can be selectable by the user such that a selected attachments can be presented to the user on the display screen 112 of the computing device upon selection thereof and the selection of a link in the field 512 can cause a web browser to open (or a new tab to open) and display a web site corresponding to the link to the user.

Figure 6:
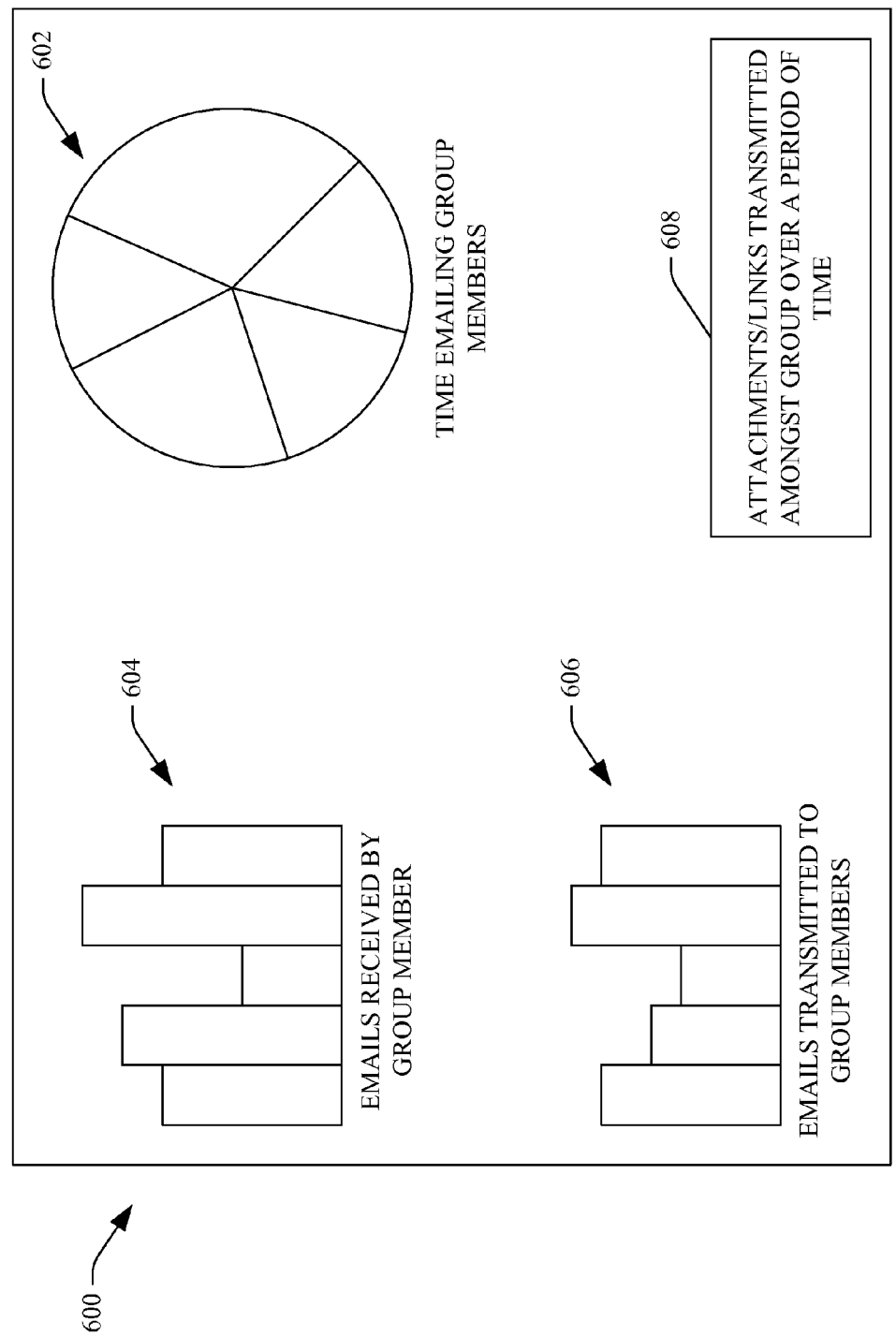
FIG. 6 illustrates an example graphical user interface that depicts a summary of email usage with respect to a user and a learned social group of a user.

Referring now to FIG. 6, an example graphical user interface 600 that includes information pertaining to a summary of email activity of the user with respect to at least one social group of the user is illustrated. The graphical user interface 600 includes a first graphical item 602 that represents an amount of time spent emailing members of the learned social group. The amount of time can encompass a total amount of time reading and composing emails pertaining to individuals in the learned social group, an amount of time only composing emails to individuals in the learned social group, an amount of time only reading emails sent from individuals in the learned social group, an amount of time a web page pertaining to the social group is open in a web browser, etc.

The graphical user interface 600 may also include a graphical item 604 that conveys to the user a number of emails received by certain members in the learned social group of the user. Thus, the user can ascertain which individual in the learned social group of the user has transmitted a greatest number of emails to the user and which individuals in the learned social group of the user have transmitted a least number of emails to other individuals in the learned social group of the user.

The graphical user interface 600 may also include a third graphical item 606 that can illustrate to the user a number of emails transmitted by the user to certain individuals in the learned social group of the user. The third graphical item 606 may be organized in a manner selected by the user. For instance, the third graphical item 606 may be a graph that is indicative of a number emails transmitted by the user where certain individuals are included in the "To:" line of the emails. In another example, the third graphical item 606 can be indicative of a number of emails transmitted by the user to members in the learned social group where the such individuals are included in a "To:" or "Cc:" line of the emails. Other manners for displaying information pertaining to how the user communicates with members of social groups are contemplated and intended to fall under the scope of the hereto appended claims.

The graphical user interface 600 may also include a field 608 that presents to the user attachments and/or links transmitted amongst individuals in the first learned social group over a determined period of time. The determined period of time can be selected by the user (e.g., a month, two months, etc.). The field 608 may also include data that indicates which attachments have been read by the user, which attachments have been read by other individuals in the learned social group of the user, which links have been selected by the user, which links have been selected by other individuals in the learned social group of the user, etc. Furthermore, attachments and/or links in the field 608 may be selectable as described above. While certain data has been described as being shown in the graphical user interface 600 pertaining to a summary of email usage of the user with respect to the learned social group of the user, it is to be understood that other data summarizing email usage of the user with respect to the learned social group of the user over time is contemplated.

Figure 7:
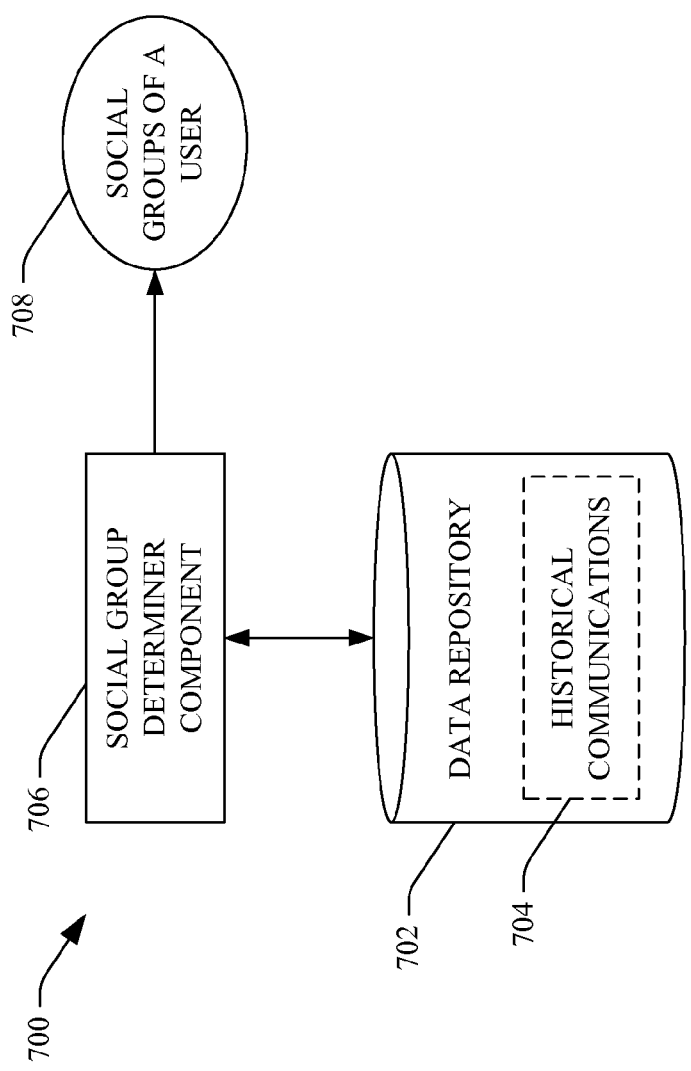
FIG. 7 is a functional block diagram of an example system that facilitates automatically learning social groups of a user based at least in part upon historical communications pertaining to the user.

Now referring to FIG. 7, an example system 700 that facilitates determining social groups of a user based upon historical communications pertaining to the user is illustrated. The system 700 includes a data repository 702 that comprises historical communications 704 pertaining to the user. The historical communications 704 can include emails, text messages, phone and video communication, comments made between individuals on social networking sites, etc. A social group determiner component 706 can access the data repository 702 and analyze the historical communications 704 and determine social groups of the user based at least in part upon communication patterns in the historical communications 704. Thus, social groups can be learned based upon topic, project, people, etc. Example techniques for learning social groups based at least in part upon historical communications of a user are described in U.S. Pat. No. 7,167,910 issued Jan. 23, 2007 and entitled "SOCIAL MAPPING OF CONTACTS FROM COMPUTER COMMUNICATION INFORMATION," the entirety of which is incorporated herein by reference. Upon analyzing the historical communications 704 the social group determiner component 706 can output a plurality of social groups of the user 708, wherein each of the social groups of the user can include at least one individual.

Figure 8:
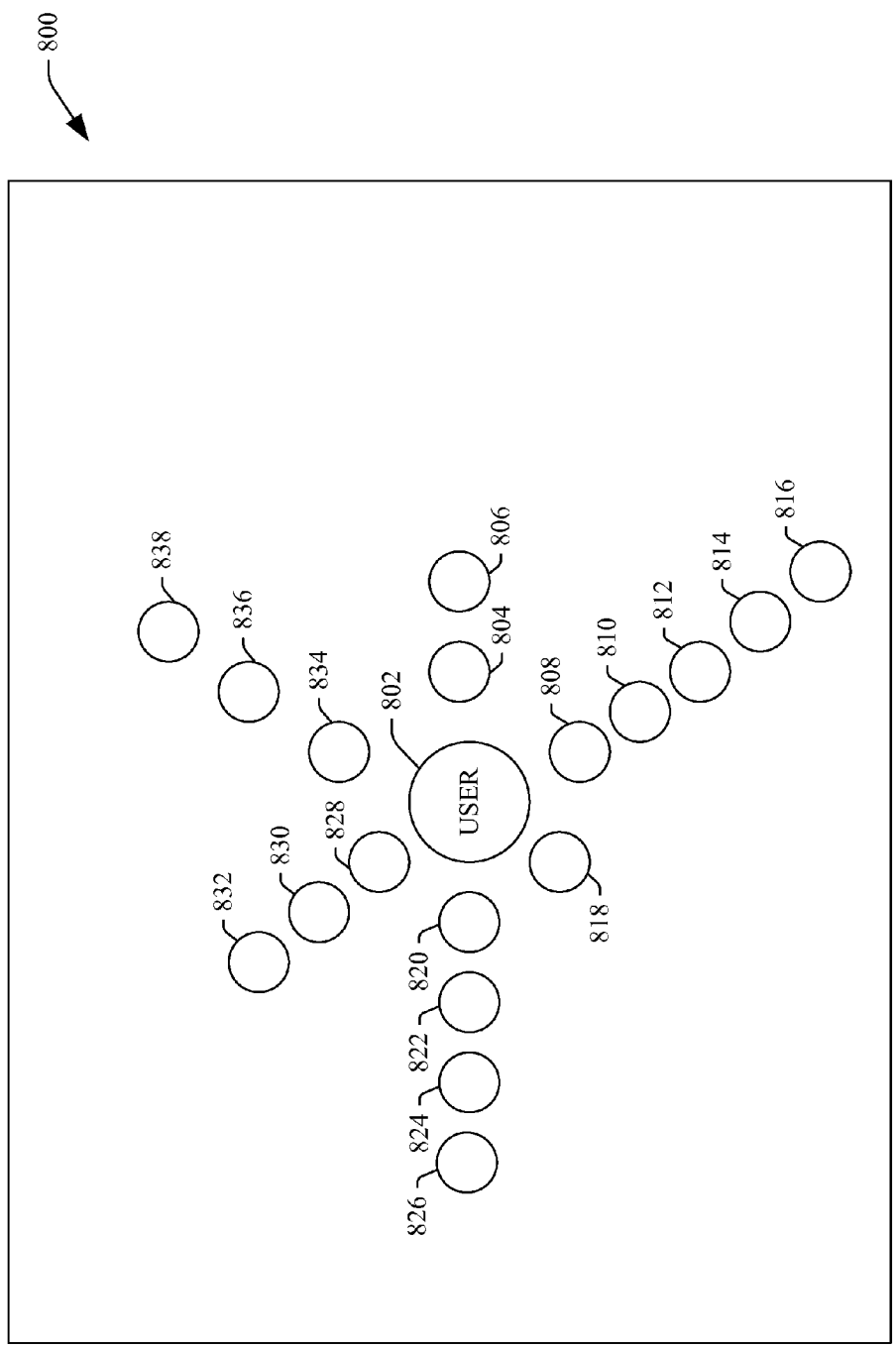
FIG. 8 is an example graphical user interface that illustrates learned social groups of a user.

Referring now to FIG. 8, an example graphical user interface 800 that illustrates social groups of a user is illustrated. The graphical user interface 800 comprises a graphical item 802 that is representative of the user, wherein the graphical item 802 may be an image of the user or other suitable avatar. The graphical user interface 800 also includes a plurality of other graphical items 804-838 that represent individuals that have been in communication with the user by way of some form of electronic messaging. As can be ascertained from reviewing the graphical user interface 800, individuals represented by the graphical items 804-838 have been assigned to certain groups of individuals (learned social groups corresponding to the user). For instance, individuals represented by the graphical items 804 and 806 have been learned to be in a first social group of the user. Individuals represented by graphical items 808-816 have been learned to be in a second social group of the user. An individual represented by the graphical item 818 has been learned to be in a third social group of the user. Individuals represented by graphical items 820-826 have been learned to be in a fourth social group of the user. Individuals represented by the graphical items 828-832 have been learned to be in a fifth social group of the user, and individuals represented by the graphical items 834-838 have been learned to be in a sixth social group of the user.

Each of the graphical items 804-838 may be selectable and movable by the user such that the user can modify social groups (modify members of social groups). For example, the user may wish that the individual represented by the graphical item 814 be removed from the second social group and placed in the fifth social group. Accordingly, the user can utilize a mouse or other suitable mechanism to select the graphical item 814 and move it to a location that corresponds to the fifth social group. Also, an individual can be removed from the group without being assigned to any other group, or can be added to a group even if there was no initial graphical representation. Furthermore, while not shown, one individual may be assigned to multiple social groups. This may happen automatically and/or upon receipt of a command from the user. The graphical user interface 800 may be accessible by the user upon selection of a button in an email application, for instance. Thus, the user is free to modify individuals in social groups at any point in time. Furthermore, as indicated above, the social group determiner component 706 (FIG. 7) can be configured to periodically execute over the historical communications 704 as additional communications are received to update the social groups of the user. Pursuant to an example, when a change is made to a social group of the user automatically an indication can be provided to the user notifying the user of such change. The user may then accept the change or access the graphical user interface 800 to modify individuals assigned to a particular social group.

Figure 9:
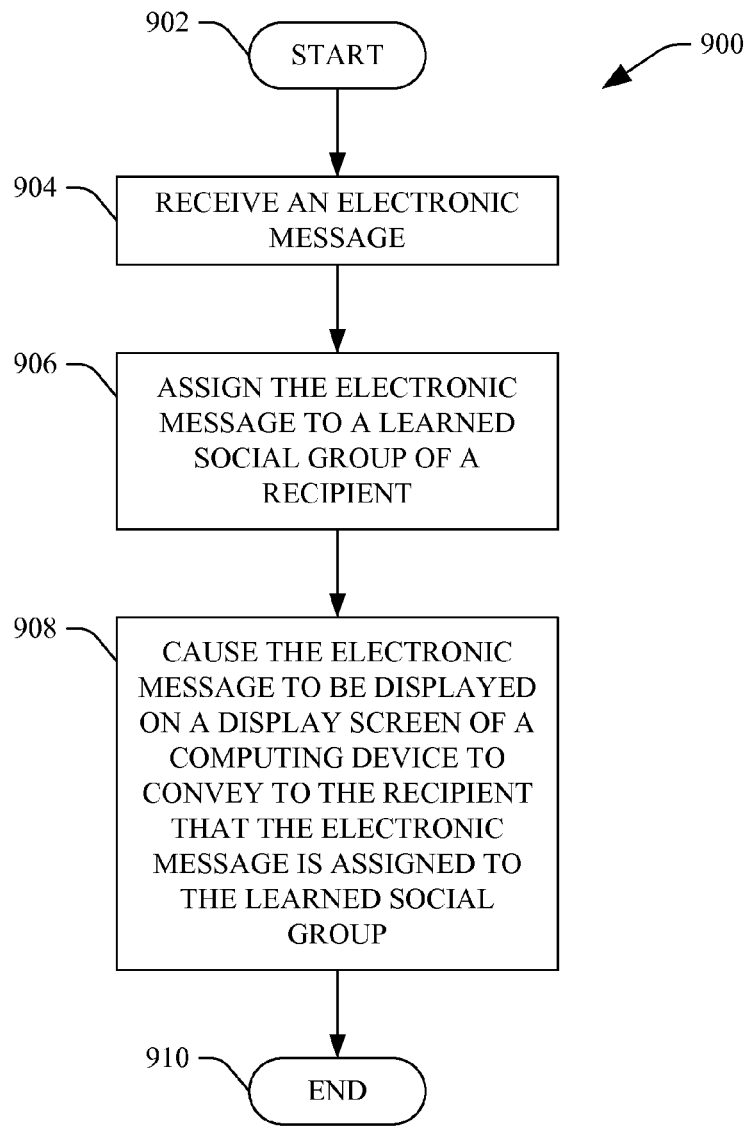
FIG. 9 is a flow diagram that illustrates an example methodology for assigning an electronic message to a learned social group of a user.
Figure 10:
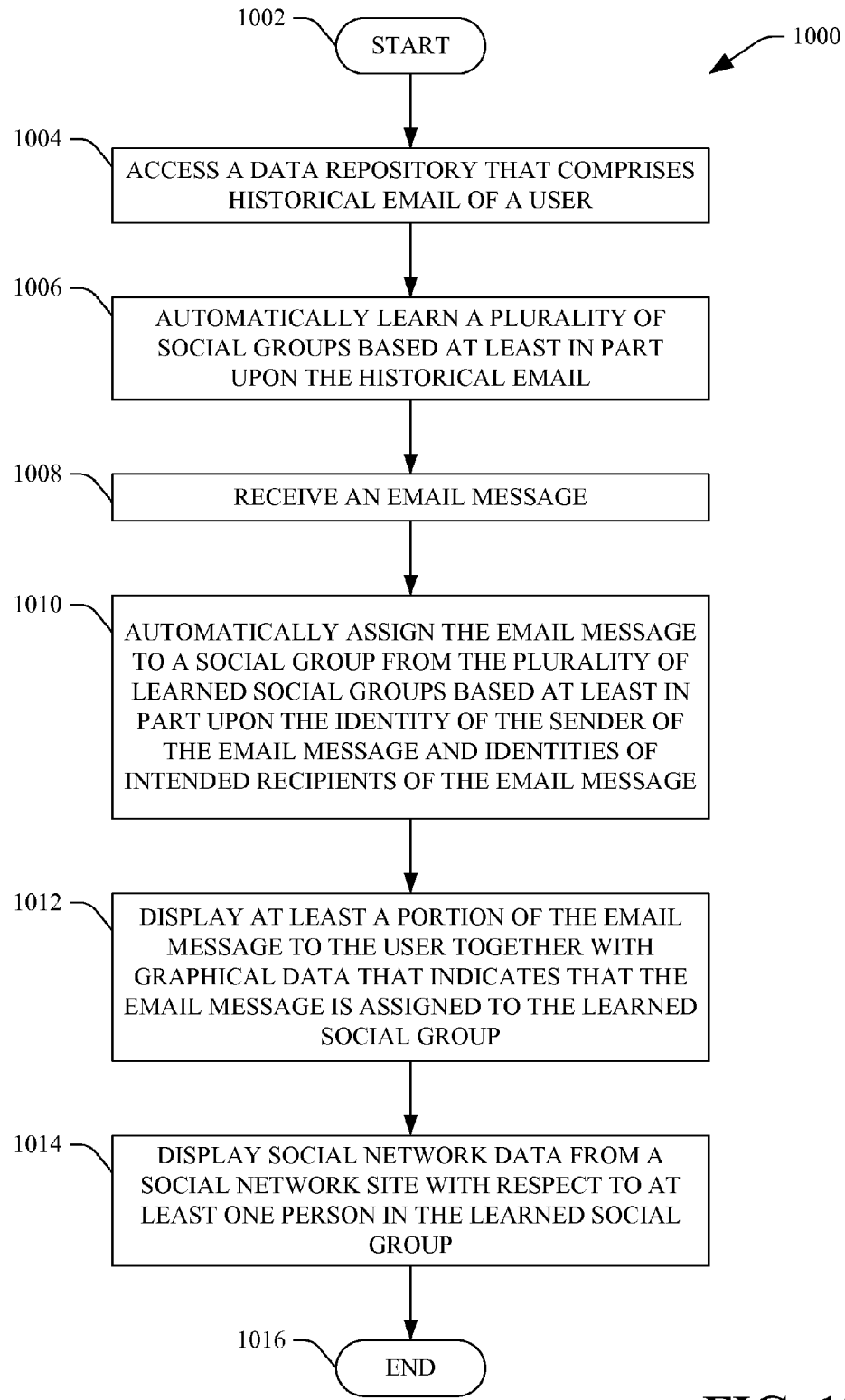
FIG. 10 is a flow diagram that illustrates an example methodology for automatically assigning an email message to a learned social group of a user.

With reference now to FIGS. 9 and 10, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 9, a methodology 900 that facilitates assigning electronic messages in an automated fashion to a learned social group of a user is illustrated. The methodology 900 begins at 902, and at 904 an electronic message is received. The electronic message can be an email, a text message, a comment on a blog or other suitable message. Furthermore, the electronic message may include data that identifies a sender of the electronic message and at least one intended recipient of the electronic message. Of course, the electronic message may include numerous intended recipients. For instance, the electronic message may include at least one individual in a "To:" field and at least one individual in a "Cc:" field.

At 906, the electronic message is assigned to at least one learned social group of the recipient from amongst a plurality of learned social groups of the recipient. As described above, the plurality of learned social groups of the recipient are at least semi-automatically learned based at least in part upon historical electronic correspondence between the recipient and contacts of the recipient, wherein the contacts of the recipient include the sender.

At 908, the electronic message is caused to be displayed to the recipient on a display screen of a computing device. Additionally, the electronic message is displayed in such a manner as to convey to the recipient that the electronic message is assigned to the at least one learned social group of the recipient. The methodology 900 completes at 910.

With reference now to FIG. 10, a methodology 1000 that facilitates automatically assigning an email to a particular learned social group of a recipient of the email is illustrated. The methodology 1000 starts at 1002, and at 1004 a data repository is accessed that comprises historical email of a user. The historical email of the user can include emails transmitted by the user as well as emails received by the user.

At 1006, a plurality of social groups of the user are automatically learned based at least in part upon the historical email accessed at 1004. As indicated above, social groups of the user can be automatically learned based at least in part upon communication patterns between the user and other individuals in the historical email of the user. Furthermore, at least one of the plurality of learned social groups can be automatically updated based upon email communications between the user and other individuals over time. Thus, as communication patterns between the user and individuals in a learned social group change, the social groups themselves can change.

At 1008, an email message is received, wherein the email message includes data that is indicative of an identity of a sender as well as data that is indicative of identities of individuals of the intended recipients of the email message (e.g., individuals included on a "To:" or "Cc:" line of the email message.

At 1010, the email message is automatically assigned to at least one social group from among the plurality of social groups of the user based at least in part upon the identity of the sender and/or the identities of individuals that are intended recipients of the email message. Furthermore, a level of importance can be assigned to the email message based at least in part upon the identity of the sender of the email message and/or identities of the individuals that are intended recipients of the email message.

At 1012, at least a portion of the email message is displayed to the user together with graphical data that informs the user that the email message is assigned to the at least one social group. For instance, text or an image can be assigned to represent the first social group and such email can be placed in a graphical user interface together with the text and/or image representative of the at least one social group to indicate to the user that the received email has been assigned to the at least one social group.

At 1014, social network data from a social network web site is displayed with respect to at least one person in the at least one social group of the user. Furthermore, the social network data can be displayed in a manner that indicates to the user that the social network data corresponds to the at least one social group. Therefore, an email application can organize email around social groups of a user and the email application can further be configured to display data from secondary sources corresponding to individuals in social groups of the user. The methodology 1000 completes at 1016.

Figure 11:
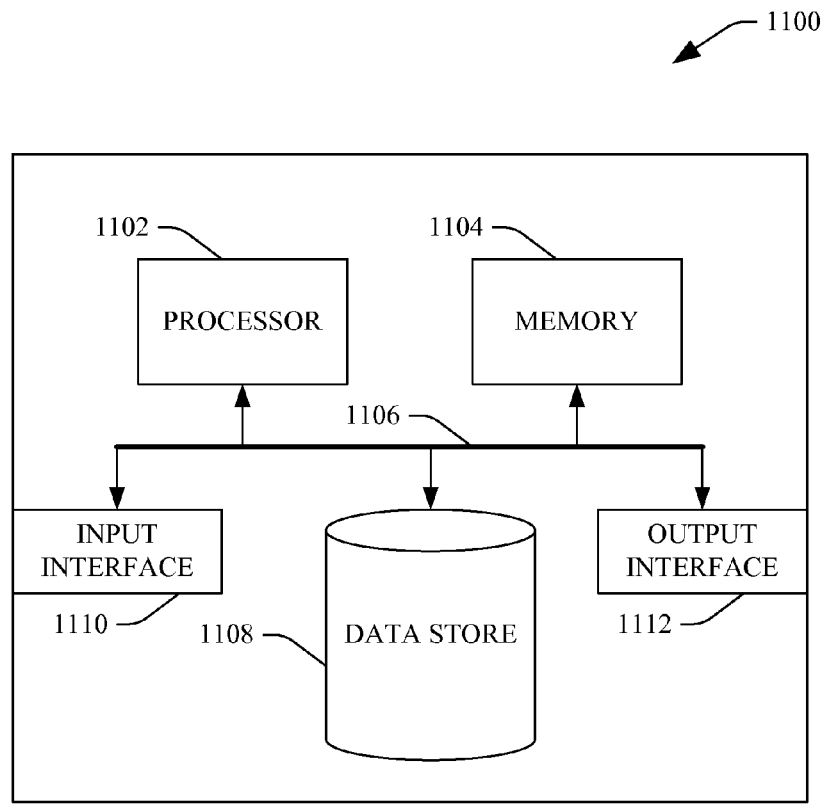
FIG. 11 is an example computing system.

Now referring to FIG. 11, a high-level illustration of an example computing device 1100 that can be used in accordance with the systems and methodologies disclosed herein is illustrated. For instance, the computing device 1100 may be used in a system that supports automatically learning social groups of a user based upon historical electronic communications pertaining to the user. In another example, at least a portion of the computing device 1100 may be used in a system that supports automatically assigning electronic messages to at least one learned social group of a user. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store learned social groups of a user, images or avatars corresponding to groups or individuals therein, historical communications of the user, etc.

The computing device 1100 also includes an output interface that interfaces a computing device 1100 with one or more external devices. For example the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   receiving, at an electronic communications application, a selection of a social group that comprises a plurality of members; and
   responsive to receiving the selection of the social group, causing a plurality of attachments to messages previously transmitted amongst the plurality of members of the social group to be displayed on a display of a computing device.

2. The method of claim 1, the electronic communications application being an email application.

3. The method of claim 1, further comprising:
   receiving an update to a social networking site pertaining to a member of the social group; and
   responsive to receiving the selection of the social group, causing the update to the social networking site to be displayed concurrently with the plurality of attachments on the display of the computing device.

4. The method of claim 1, further comprising:
   identifying a news item that is relevant to the social group; and
   responsive to receiving the selection of the social group, causing the news item to be displayed concurrently with the plurality of attachments on the display of the computing device.

5. The method of claim 1, further comprising:
   learning the social group based upon recipients of messages transmitted by way of the electronic communications application.

6. The method of claim 1, further comprising:
   receiving a message transmitted from a member of the social group; and
   responsive to receiving the selection of the social group, causing the message to be displayed concurrently with the plurality of attachments on the display of the computing device.

7. The method of claim 1, the electronic communications application being a social networking application.

8. The method of claim 1, further comprising:
   causing graphical items to be displayed on the display screen of the computing device, the graphical items representative of respective social groups, wherein receiving the selection of the social group comprises receiving a selection of a graphical item from the graphical items that represents the social group.

9. The method of claim 1, further comprising:
removing a member from the social group based upon messages transmitted amongst other members of the social group failing to include the member as a recipient.

10. The method of claim 1, further comprising:
receiving a plurality of messages;
assigning the plurality of messages to the social group;
labeling each message in the plurality of messages as being a low priority message;
generating a summary message that summarizes the plurality of messages; and
responsive to receiving the selection of the social group, causing the summary message to be displayed on the display screen of the computing device concurrently with the plurality of attachments.

11. A computing system, comprising:
a processor; and
a memory that comprises components that are executed by the processor, the components comprising:
    a data receiver component that is configured to receive messages transmitted between members of a social group, the messages have attachments; and
    a display component that is configured to display the attachments in a field of a graphical user interface responsive to receipt of an indication that the social group has been selected.

12. The computing system of claim 11, wherein one of an email application or a social networking application comprises the data receiver component and the display component.

13. The computing system of claim 11, the plurality of components further comprising:
    a data receiver component that is configured to receive an update to a social networking feed for a member of the social group, the display component configured to display the update in another field of the graphical user interface responsive to the data receiver component receiving the update.

14. The computing system of claim 11, the plurality of components further comprising:
    an assignor component that is configured to assign an incoming message to the social group based upon identities of recipients of the message, the assignor component further configured to assign an importance value to the message, the display component configured to display the incoming message in another field of the graphical user interface responsive based upon the importance value assigned to the message relative to importance values assigned to other messages assigned to the group.

15. The computing system of claim 14, the display component configured to display the message to indicate the importance value assigned to the message.

16. The computing system of claim 11, the plurality of components further comprising:
    an assignor component that is configured to assign importance values to messages assigned to the social group, the assignor component further configured to generate a summary message that is representative of a plurality of messages identified as being low priority by the assignor component.

17. The computing system of claim 11, wherein the data receiver component is configured to receive links to web pages transmitted between members of the social group, the display component configured to display the links in another field of the graphical user interface.

18. The computing system of claim 11, wherein the data receiver component is configured to receive data located in storage that is shared amongst members of the social group, the display component configured to display the data in another field of the graphical user interface.

19. The computing system of claim 11, wherein the display component is configured to assign data to the attachments that indicate which members of the social group have opened the attachments.

20. A computer-readable memory comprising instructions that, when executed by a processor, cause the processor to perform acts comprising:
receiving a selection of a social group from a plurality of potential social groups;
responsive to receiving the selection of the social group, identifying attachments to messages transmitted between members of the social group by way of an electronic communication application;
responsive to identifying the attachments to the messages, causing the attachments to be displayed in a field of a graphical user interface.

* * * * *